US012362126B2

(12) United States Patent
Vassholz et al.

(10) Patent No.: US 12,362,126 B2
(45) Date of Patent: Jul. 15, 2025

(54) X-RAY SOURCE AND SYSTEM AND METHOD FOR GENERATING X-RAY RADIATION

(71) Applicant: Georg-August-Universität Göttingen Stiftung Öffentlichen Rechts, Göttingen (DE)

(72) Inventors: Malte Vassholz, Göttingen (DE); Tim Salditt, Göttingen (DE)

(73) Assignee: GEORG-AUGUST-UNIVERSITÄT GÖTTINGEN STIFTUNG ÖFFENTLICHEN RECHTS, Göttingen (DE)

( * ) Notice: Subject to any disclaimer, the term of this patent is extended or adjusted under 35 U.S.C. 154(b) by 288 days.

(21) Appl. No.: 17/917,627

(22) PCT Filed: Apr. 7, 2021

(86) PCT No.: PCT/EP2021/059013

§ 371 (c)(1),
(2) Date: Oct. 7, 2022

(87) PCT Pub. No.: WO2021/204846

PCT Pub. Date: Oct. 14, 2021

(65) Prior Publication Data

US 2023/0145938 A1 May 11, 2023

(30) Foreign Application Priority Data

Apr. 8, 2020 (DE) ..................... 10 2020 109 906.1

(51) Int. Cl.

| | |
|---|---|
| ***H01J 35/06*** | (2006.01) |
| ***G21K 1/06*** | (2006.01) |
| ***H01J 35/08*** | (2006.01) |

(52) U.S. Cl.
CPC ............ *H01J 35/064* (2019.05); *G21K 1/062* (2013.01); *H01J 35/116* (2019.05); *H01J 2235/086* (2013.01)

(58) Field of Classification Search
None
See application file for complete search history.

(56) References Cited

U.S. PATENT DOCUMENTS 8,971,496 B2 3/2015 Okamoto et al.

FOREIGN PATENT DOCUMENTS

| | | | |
|---|---|---|---|
| DE | 10 2010 002 778 A1 | | 9/2011 |
| WO | WO 2013/039078 A1 | | 3/2013 |

OTHER PUBLICATIONS

K. Valery and U. Sergey, "Generation of X-rays by relativistic electrons in waveguide structures," 2012 7th International Forum on Strategic Technology (IFOST), Tomsk, Russia, 2012, pp. 1-6 (Year: 2012).*

(Continued)

*Primary Examiner* — Edwin C Gunberg
(74) *Attorney, Agent, or Firm* — Birch, Stewart, Kolasch & Birch, LLP

(57) ABSTRACT

The invention relates to an X-ray source (10) comprising at least one waveguide (30) for X-ray radiation, wherein the at least one waveguide (30) has a core (32) and a casing (40) surrounding the core (32), and wherein at least one part of the waveguide (30) is designed to emit X-ray radiation (50), if the part of the waveguide (30) is bombarded with electrons (52). The invention also relates to a system for generating X-ray radiation comprising an X-ray source of this type, and a method for generating X-ray radiation by means of an X-ray source of this type or a system of this type.

15 Claims, 10 Drawing Sheets

(56) References Cited

OTHER PUBLICATIONS

Bazhenova et al., "Microfocus x-ray tube with a built-in waveguide collimator", Tech. Phys. Lett., Jan. 1993, vol. 19, No. 1, pp. 61-62.
International Search Report (PCT/ISA/210), issued in PCT/EP2021/059013, dated Jul. 2, 2021.
Kaplin et al., "X-rays generated by relativistic electrons in a waveguide radiator mounted inside a betatron", Nuclear Instruments and Methods in Physics Research B, 2011, vol. 269, pp. 1518-1522.
Written Opinion of the International Searching Authority (PCT/ISA/237), issued in PCT/EP2021/059013, dated Jul. 2, 2021.

* cited by examiner

X-RAY SOURCE AND SYSTEM AND METHOD FOR GENERATING X-RAY RADIATION

The present invention relates to an X-ray source, to a system for generating X-ray radiation, and to a method for generating X-ray radiation.

Conventional X-ray sources are in the form of metal targets for generating X-ray radiation including bremsstrahlung radiation and characteristic X-ray radiation by electron bombardment (see in this connection for example the textbook of R. Behling, "Modern Diagnostic X-Ray Sources—Technology, Manufacturing, Reliability", CRC Press, ISBN-13: 978-1-4822-4132-7, 2016 and the textbook of M. Bass, "Handbook of Optics", Vol. III—Classical Optics, Vision Optics, X-Ray Optics, in particular Chapter 31, ISBN 0-07-135408-5, 2001). Generally, such metal targets are arranged in the form of an X-ray anode in an X-ray tube. At a cathode, typically a thermionic cathode, located opposite the anode, electrons are freed and accelerated in the electric field between the thermionic cathode and the X-ray anode. When they strike the metal target, substantially two processes occur by which the kinetic energy of the electrons is converted into X-ray radiation. Firstly, the incident electrons are decelerated in the field of the atomic nuclei of the X-ray anode, so that part of their kinetic energy is converted into electromagnetic radiation, the so-called bremsstrahlung radiation. Secondly, the incident electrons have sufficient kinetic energy to remove electrons from one of the inner electron shells of the metal target atoms. When the resulting gaps in the electron shell in question are filled by an electron from an outer shell, X-ray radiation that is characteristic of this transition is emitted.

In principle, the intensity of the X-ray radiation, in particular the brilliance, increases with the stream of electrons striking the X-ray anode. Therefore, in order to increase the brilliance of conventional systems for generating X-ray radiation, the number of electrons freed at the cathode is generally increased. However, this results in a higher heat input into the homogeneous X-ray anode, so that the increase in the brilliance in particular in the case of solid metal targets of the X-ray anode is limited. In addition, conventional X-ray sources generally emit the X-ray radiation over a solid angle of $4\pi$ sr. The phase-spatial distribution of the X-ray photons is difficult to change owing to the X-ray refractive index $n=1-\delta+i\beta$ (wherein the real part $1-\delta$ represents the so-called refractive component and the imaginary part $\beta$ represents the absorbing component, and wherein $\delta$ and $\beta$ are very much smaller than 1). In applications for which high coherence and a high phase space density of the photons are necessary, synchrotron radiation has therefore hitherto normally been used.

Against this background, it is an object of the present invention to provide an X-ray source and a system for generating X-ray radiation, each of which is distinguished by a relatively compact construction and can nevertheless emit X-ray radiation of high brilliance. It is a further object of the invention to provide a comparatively simple method for generating such X-ray radiation.

This object is achieved by an X-ray source having the features of claim 1, by a system for generating X-ray radiation having the features of claim 14, and by a method for generating X-ray radiation having the features of claim 15.

The X-ray source has at least one waveguide for X-rays, which waveguide has a core and a casing surrounding the core. The X-ray source can be an X-ray target, in particular an X-ray anode. The X-ray source can further have a substrate, wherein the waveguide can be carried by the substrate. Alternatively, the waveguide of the X-ray source can be self-carrying. At least one part of the waveguide is adapted to emit X-ray radiation if the part of the waveguide is bombarded with electrons. The X-ray source is thus in particular adapted to generate the X-ray radiation directly in the waveguide (i.e. in the core or in the casing) in order to radiate it directly into the core without propagation outside the waveguide. In other words, the X-ray source is advantageously adapted to emit the X-ray radiation generated by spontaneous emission directly into the waveguide/into the modes of the waveguide. That is to say, the waveguide modes can be excited without the X-ray radiation that excites the waveguide modes having to propagate outside the waveguide before the excitation. The X-ray source is advantageously further adapted to emit X-ray radiation directionally, in particular in the longitudinal direction or the main direction of extent of the waveguide. The electrons can in each case have an energy of at least 100 eV, at least 500 eV, at least 1 keV or at least 5 keV.

The part (provided for bombardment with electrons) of the waveguide can be configured in different ways. When the core, in a variant, has a first core portion and a second core portion, the part of the waveguide preferably contains the first core portion. In this case, the first core portion is thus configured to emit X-ray radiation if it is bombarded with electrons. Spontaneous emission here takes place in the core of the waveguide itself, that is to say the X-ray radiation is advantageously generated in the core of the waveguide itself. The first core portion preferably has a smaller, in particular more than 50% smaller, volume than the second core portion.

As described in detail hereinbelow, the first core portion can be thinner than the second core portion.

It is further conceivable that the part of the waveguide includes the entire core, that is to say the entire core of the waveguide belongs to the part of the waveguide that is provided for bombardment. In this case, the second core portion can de facto be absent and the entire core can be formed by the first core portion, that is to say the core can have any of the features of the first core portion that are discussed herein. In this variant too, spontaneous emission takes place in the core of the waveguide itself, that is to say the X-ray radiation is advantageously generated in the core of the waveguide itself.

The part of the waveguide can additionally include at least part of the casing, in particular the entire casing. In this case, what is said hereinbelow in relation to the casing (in particular the choice of material) can apply to only part of the casing or alternatively to the entire casing. The part of the casing can in this variant emit X-ray radiation from the part of the casing, in particular directly, into the core of the waveguide at the boundary with the core. The distance between the emitting atom in the casing and the core is in particular smaller than the width of an evanescent wave.

In contrast to conventional X-ray sources, it is thus not necessary in the case of the X-ray source according to the invention to couple X-ray radiation generated outside the waveguide into the waveguide via generally complicated and lossy X-ray optics in order to excite modes that develop in the waveguide. Instead, substantially directional X-ray radiation can be generated in the waveguide itself by means of the X-ray source according to the invention. The X-ray radiation is thus de facto emitted directly from the first core portion or the boundary between the casing and the core into the X-ray waveguide modes. It preferably comprises bremsstrahlung radiation and characteristic X-ray radiation.

The waveguide extends in the present case in a main direction of extent (longitudinal direction), along which the modes of the X-ray radiation develop, propagate in the waveguide and/or exit the waveguide. The waveguide can be one- or two-dimensional. If the waveguide is a two-dimensional waveguide, the longitudinal axis of the waveguide, in particular the center longitudinal axis of the core, can run in this main direction of extent. The two-dimensional waveguide can have a (substantially) circular, oval, polygonal, rectangular or square cross-section. By contrast, if the waveguide is a one-dimensional waveguide with two main directions of extent defining a main plane of extent, the waveguide can extend along this main plane of extent. The longitudinal axis can in this case lie in the main plane of extent. This applies, analogously to the entire waveguide, also to the substrate, the core, the first core portion, the second core portion and/or the casing.

In this text, one-dimensional waveguides, in accordance with the general use of this term in the field of X-ray physics, can be waveguides which confine/guide the electromagnetic wave of the X-ray radiation in one dimension. In one-dimensional waveguides, the electromagnetic wave can thus propagate in the waveguide along two dimensions in a plane, and the modes can be formed only in a direction perpendicular thereto. Therefore, one-dimensional waveguides can also be referred to as planar waveguides or film waveguides. Two-dimensional waveguides (also referred to as channel waveguides), on the other hand, can confine the electromagnetic wave in two dimensions, so that the electromagnetic wave can propagate only along one dimension and the modes are formed in two directions perpendicular to this dimension.

The longitudinal axis of the waveguide can extend linearly or curved at least in some portions, provided that the curve of the waveguide is such that at least part (at least 30%) of the X-ray radiation propagated in the core of the waveguide always remains under total reflection at the casing in the core until it exits the core at an end of the waveguide on the exit side in the longitudinal direction. The critical angle $\theta_c$ for this total reflection can be calculated by means of the following formula:

$$\theta_c = \arccos(n_M/n_K),$$

wherein $n_M$ is the refractive part (real part) of the complex refractive index $\tilde{n}_M = n_M + i\beta_M = 1 - \delta_M + i\beta_M$ of the casing for X-ray radiation and nK is the refractive part of the complex refractive index $\tilde{n}_K = n_K + i\beta_K = 1 - \delta_K + i\beta_K$ of the (first or second) core portion adjoining the casing for X-ray radiation. With regard to the calculation of the decrement $\delta_{M/K}$ and of the damping coefficient $\beta_{M/K}$, reference is made at this point to the relevant literature. In addition, it is conceivable that the waveguide has a beam-splitting portion at which the core is divided into at least two separate core arms. Here too, the angle of the core arms to the core is preferably so chosen that X-ray radiation propagating from the core into the core arms enters the core arms under total reflection at the casing. It is noted that all the numerical values and value ranges discussed here for the decrement and the damping coefficient apply to X-ray photons with an energy of 10 keV.

The material of the core or at least of the first core portion comprises or consists of first atom(s) of chemical elements with a first atomic number, the material of the second core portion comprises or consists of second atom(s) of chemical elements with a second atomic number, and the material of the casing comprises or consists of third atoms of chemical elements with a third atomic number, wherein the second atomic number is preferably different from the first and/or third atomic number. For the efficient generation of X-ray photons with high X-ray energies, the first atomic number is chosen to be as high as possible. In particular, the first atomic number can be greater than the second atomic number. Most preferably, the first atomic number is at least 14, at least 16, at least 18, at least 20 or at least 22. Most preferably, the second atomic number is not more than 16, not more than 14, not more than 12, not more than 10 or not more than 9 or not more than 8. If the material of the core of the waveguide, of the first/second core portion or of the casing comprises the first, second or third atoms, respectively, the atoms can in each case be distributed in the material in question in molecules, in particular metal semiconductor compounds, nanoparticles, clusters and/or colloids.

Analogously thereto, the material of the entire core or at least of the first core portion can have a first electron density, the material of the second core portion can have a second electron density, and the material of the casing can have a third electron density. The second electron density is preferably different from the first and/or third electron density. The material of the first core portion is advantageously so chosen that it (analogously to the higher atomic number of the first core portion) has the highest possible electron density, which in particular can be higher than the second electron density. The first electron density is most preferably at least 1100 $e/nm^3$, at least 1500 $e/nm^3$, at least 2000 $e/nm^3$ or at least 2200 $e/nm^3$. The second electron density is most preferably not more than 1000 $e/nm^3$, not more than 850 $e/nm^3$ or not more than 750 $e/nm^3$.

The material of the first core portion, of the second core portion and of the casing can in each case be homogeneous, that is to say each of these components can consist solely of the same chemical element. Alternatively, the material of the first core portion, of the second core portion or of the casing can be in the form of a mixture (in particular in the form of an alloy or a ceramics material). It is thereby preferred, for the efficient generation of X-ray radiation, that the material of the first core portion is a metal, in particular a transition metal. The material of the first core portion comprises or is preferably cobalt, copper, molybdenum, nickel, chromium, iron, silver, tantalum, platinum, gold or tungsten. It is also conceivable that the material of the first core portion is a metal alloy comprising the metal (in particular transition metal). The second core portion is preferably produced in part or wholly of a different material to the first core portion.

The second core portion serves in particular for the propagation in as unimpeded a manner as possible of the X-ray radiation generated in the waveguide, so that the damping coefficient $\beta_{K2}$ of the second core portion for X-ray radiation preferably has a lower value than the damping coefficient $\beta_M$ of the first core portion and/or than the damping coefficient $\beta_M$ of the casing. The preferred material for the second core portion is therefore a non-metal, in particular a semiconductor. The material of the second core portion comprises preferably or is preferably a gas, air, carbon (in particular diamond, amorphous or polycrystalline DLC (diamond-like carbon)), boron, boron carbide, beryllium, aluminum, magnesium or silicon. However, in particular in the interior of an X-ray tube in which a vacuum prevails, the second core portion can be part of the vacuum and therefore substantially empty. In this respect, vacuum in this context is also classified as a material and the explanation given here for material applies analogously to vacuum as the second core portion. Where the second core portion is in the form of vacuum, the first core portion is applied to the casing boundary, preferably by vapor deposition or ALD (atomic layer deposition), or the X-ray emission takes place from the casing itself.

The substrate can be produced from the same material or from a different material to the casing. In particular, the substrate can be produced from diamond, DLC, germanium, gallium arsenide and/or silicon, for example in the form of a silicon wafer. These substrate materials have, in particular when the substrate is monocrystalline, a relatively high surface quality and high thermal conductivity. In addition, the casing can be formed in one piece (integrally), in particular monolithically (i.e. "from one cast"), with the substrate. The monolithically one-piece form of the substrate and the casing is suitable in particular when the substrate/casing material is porous. Each pore thereby forms a core of the waveguide.

The value of the decrement δ of the material of the first core portion is preferably approximately equal to or greater than the value of the decrement δ of the material of the second core portion. The value of the decrement of the material of the first core portion can exceed the value of the decrement of the material of the second core portion by at least 20%, at least 50% or at least 100%. The decrement δ of the material of the first core portion is preferably at least $1\times10^{-7}$, at least $5\times10^{-7}$, at least $1\times10^{-6}$ or at least $5\times10^{-6}$. The decrement of the material of the second core portion is preferably not more than $5\times10^{-5}$, not more than $3\times10^{-5}$, not more than $1\times10^{-5}$ or not more than $5\times10^{-6}$. The decrement δ of the material of the casing is preferably at least $1\times10^{-7}$, at least $5\times10^{-7}$, at least $1\times10^{-6}$ or at least $5\times10^{-6}$. The decrement values and/or electron density values mentioned in this text can apply to X-ray photons with an energy of 10 keV.

In the longitudinal direction, the waveguide can extend over part of or over the entire substrate, in particular can be as long as the substrate in the longitudinal direction. The core of the waveguide can be substantially as long as the casing in the longitudinal direction. The first core portion is preferably shorter than, in particular up to 1 mm shorter than, or as long as the second core portion and/or the casing in the longitudinal direction, so that the development and emission of the modes is not disrupted. It is, however, also conceivable that the first core portion has a plurality of separate sub-portions, for example spaced apart from one another in the longitudinal or transverse direction.

It has been stated that the first core portion is preferably thinner than the second core portion. This means that the extent of the first core portion in the transverse direction (i.e. perpendicular to the longitudinal axis of the waveguide) is smaller than the extent of the second core portion in the transverse direction. The first core portion is preferably embedded in the second core portion, so that part of the second core portion can lie on either side of the first core portion in the transverse direction at any point along the longitudinal axis of the waveguide. The first core portion can thus be arranged spaced apart relative to the casing. In this case, at least part of the first core portion or the entire first core portion, when viewed in a cross-sectional plane and/or when viewed in a longitudinal plane, containing the longitudinal axis, through the waveguide, is arranged preferably in the center of the second core portion. The X-ray photons generated in the first core portion can thus be generated, in a manner that is advantageous for the uniform excitation of the modes, transversely in the center of the waveguide. The first core portion can be in contact in some portions or completely with the casing, whereby the transport of heat from the first core portion can be improved.

In order to further increase the brilliance in the case of irradiation of the electrons in the transverse direction relative to the longitudinal axis of the waveguide, it can be provided that the casing is thinner on a side of the core that is remote from the substrate than on a side of the core that faces the substrate. In particular if the waveguide is produced on the substrate by a process of deposition, low roughness of the boundary between the casing and the core can on the one hand be ensured in the case of this configuration, whereby the total reflection at the casing can be improved and thus the intensity of the X-ray radiation exiting the waveguide can be increased. On the other hand, the electrons pass more easily through the relatively thin region of the casing on the side of the core that is remote from the substrate, in order to generate X-ray radiation in the first core portion. It will be appreciated, however, that in this case too, electrons can be introduced into the waveguide along the longitudinal axis thereof in order to generate characteristic radiation and bremsstrahlung radiation at the first core portion.

In the transverse direction or radial direction of the waveguide, the first core portion is preferably not more than 20 nm, not more than 15 nm, not more than 10 nm or not more than 5 nm thick. In the same direction, the second core portion is in total preferably at least 10 nm thick, at least 20 nm thick, at least 30 nm thick or at least 40 nm thick and/or not more than 150 nm thick, 200 nm thick, 300 nm thick or 400 nm thick. If the first core portion is embedded in the second core portion, the first core portion occupies part of the second core portion, so that the (effective) thickness of the material of the second core portion is reduced by the thickness of the material of the first core portion.

A first portion of the casing, which is arranged between the core and the substrate, preferably has a thickness of at least 5 nm or at least 15 nm or at least 30 nm. A second portion of the casing, which is arranged on the side of the core that is opposite the substrate, can be not more than 100 nm thick, not more than 40 nm thick, not more than 30 nm thick, not more than 20 nm thick, not more than 15 nm, not more than 10 nm or not more than 5 nm thick. The thinner this second portion of the casing, the fewer electrons are advantageously absorbed in the casing and thus outside the core in the case of transverse irradiation. In relative terms, the thickness of the first core portion can be not more than 50%, not more than 30%, not more than 15% or not more than 10% of the thickness of the second core portion. Also, the thickness of the second portion of the casing, which is arranged on the side of the core that is opposite the substrate, can be not more than 100%, not more than 50%, not more than 30%, not more than 15% or not more than 10% of the thickness of the second core portion. The explanation given above in relation to the thickness applies to both one- and two-dimensional waveguides, wherein the thickness in the case of two-dimensional waveguides corresponds to the particular extent in the radial direction (with respect to the longitudinal axis of the waveguide) and the thickness in the case of one-dimensional waveguides corresponds to the particular extent in the transverse direction.

An X-ray source with a one-dimensional waveguide can be produced, for example, by means of physical vapor deposition, in particular by means of pulsed laser deposition, or thin-layer technology (e.g. magnetron atomization). Most preferably, the first portion of the casing (e.g. copper) is for this purpose applied with a thickness of about 40 nm to the substrate (e.g. silicon wafer). On this first portion of the casing there can be arranged (on the side of the first portion of the casing that is opposite the substrate), with a thickness of about 40 nm, a first part of the second core portion (e.g. in the form of a carbon layer, in particular in the form of diamond or DLC). The first core portion (for example in the form of a cobalt layer) can in turn be formed thereon with a thickness of about 2 nm. A second part of the core portion (for example of the same material as the first part of the second core portion) can in turn be arranged thereon with a thickness of about 40 nm. A second portion of the casing can be arranged on the second part of the core portion on the side that is opposite the substrate and can preferably have a thickness of about 5 nm. In this text, the term "about" can mean a range of +/−100% of the respective value.

The X-ray source can have a single (one-dimensional or two-dimensional) waveguide or a plurality of waveguides. When the X-ray source has a plurality of waveguides, they can be configured substantially as a substrate having a waveguide stack carried by the substrate. Each of the waveguides of this waveguide stack can have one or more of the features of the at least one waveguide that are described above. The plurality of waveguides are preferably arranged periodically in the transverse direction. All the waveguides can be of the same construction. Alternatively, it is conceivable that the total thickness of the particular waveguide decreases as the distance from the substrate increases. It will be appreciated that all the waveguides described herein are for X-rays, that is to say are adapted to guide X-rays along the longitudinal axis.

In particular when the substrate is configured monolithically with the casing, a two-dimensional (channel) waveguide stack can be in the form of an arrangement of (parallel and/or cylindrical) pores etched into the substrate, or into the casing. The substrate/casing can thereby be a metal or a semiconductor. The pores can be produced, for example, by self-assembly. They can additionally be coated, in particular by means of atomic layer deposition (ALD).

A system proposed here for generating X-ray radiation comprises a vacuum chamber, an X-ray source, described in detail hereinbefore, arranged in the vacuum chamber, and an electron source arranged in the vacuum chamber, which electron source is adapted to emit electrons into the vacuum and radiate them (axially and/or transversely with respect to the longitudinal direction of the waveguide) onto the X-ray source, in particular onto the part of the waveguide provided for bombardment with electrons. The vacuum chamber can be an X-ray tube. There is suitable as the electron source, for example, an X-ray cathode (e.g. in the form of a thermionic cathode), which is adapted to release electrons into the vacuum when subjected to an electric voltage.

A negative potential is preferably applied to the X-ray cathode. The X-ray source preferably forms part of the X-ray anode or the X-ray anode and is grounded or applied to a potential that is positive at least relative to the X-ray cathode. The potentials of the X-ray cathode and the X-ray anode are so chosen that electrons are accelerated in the electric field between the X-ray cathode and the X-ray anode to an energy of at least 100 eV, at least 500 eV, at least 1 keV or at least 5 keV. The X-ray source is preferably so arranged that the electrons propagate transverse to or along the longitudinal axis of the waveguide before they strike the waveguide, in particular the part of the waveguide. In this manner, the electrons bombarded onto the X-ray source can first pass through the second portion of the casing and the second part of the second core portion before they can strike the first core portion. With an appropriate choice of the material of the second portion of the casing, the electrons can already generate X-ray radiation there and deliver it into the waveguide. Alternatively, the electrons can generate X-ray radiation in the first core portion at the latest and deliver it into the core. In this respect, the X-ray radiation is emitted directly into the waveguide modes.

The method proposed here for generating X-ray radiation comprises the steps of providing an X-ray source described in detail hereinbefore or a described system, comprising the X-ray source, for generating X-ray radiation, and irradiating the X-ray source, in particular the part (provided for bombardment with electrons) of the waveguide, with radiation and/or bombarding the X-ray source, in particular the part (provided for bombardment) of the waveguide, with electrons in order to generate the X-ray radiation. Irradiating the X-ray source with radiation can comprise one or more of the following: irradiation with X-ray radiation, irradiation with synchrotron radiation, irradiation with ions, irradiation with high-energy ions, irradiation with laser pulses, irradiation with ultra-short and/or focused laser pulses. If the X-ray source, in particular the part of the X-ray source, is irradiated with synchrotron radiation, X-ray radiation can be generated in situ in the core of the waveguide by means of X-ray fluorescence.

Preferred embodiments of an X-ray source and of a system for generating X-ray radiation will now be explained in greater detail with reference to the accompanying schematic drawings, wherein FIG. 1 shows a first embodiment of an X-ray source in a schematic partially cross-sectional view;

FIG. 2 shows the X-ray source of FIG. 1 in perspective in a measuring setup for characterizing the emission properties thereof;

FIG. 3*a* shows a curve of the value of the decrement δ over the cross-section of the X-ray source of FIG. 1;

FIG. 3*b* shows a diagram of the intensity of the X-ray radiation over the angle of elevation $\theta_f$ for the X-ray source of FIG. 1;

Figure 1:
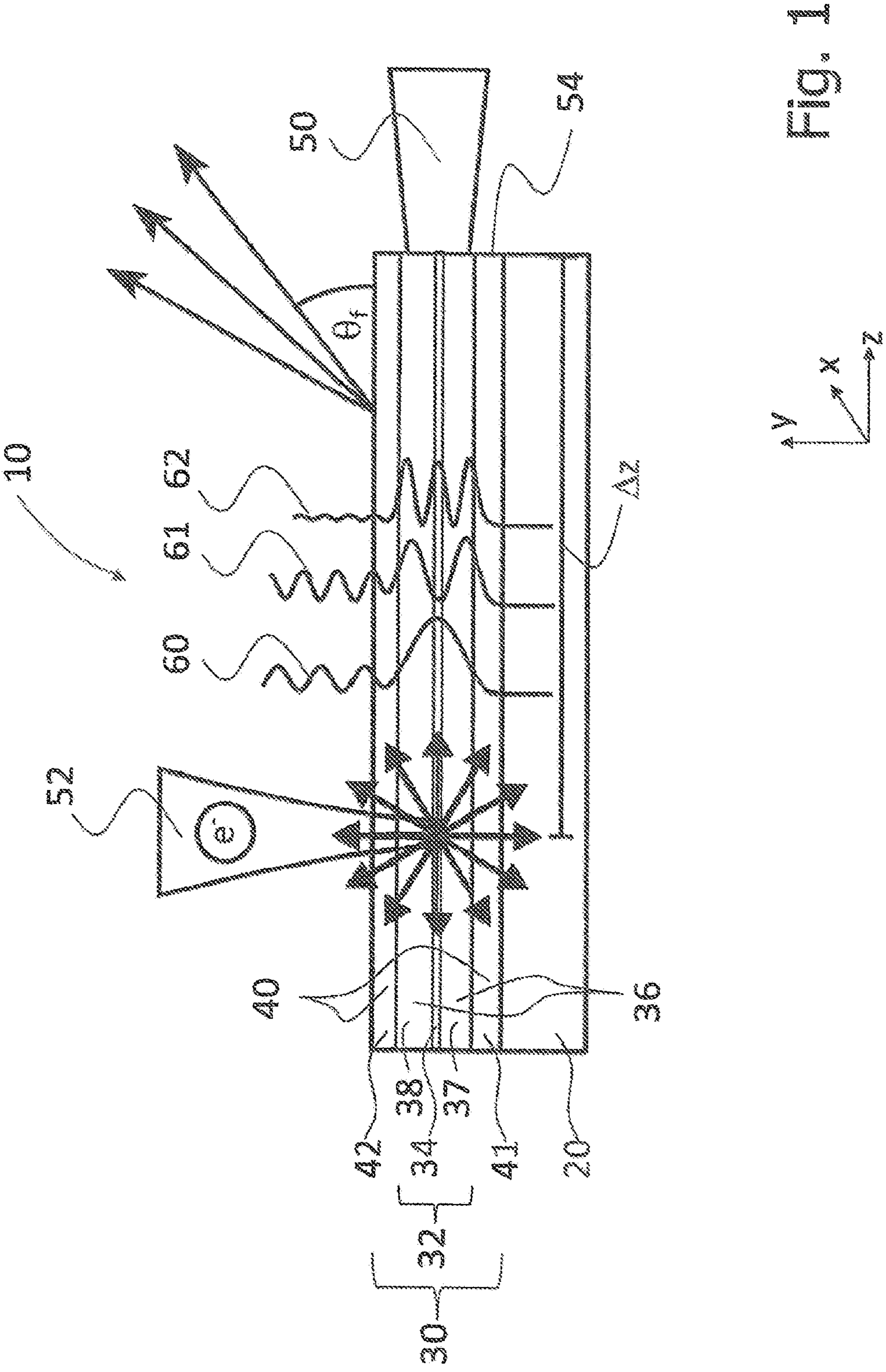
Figure 6B:
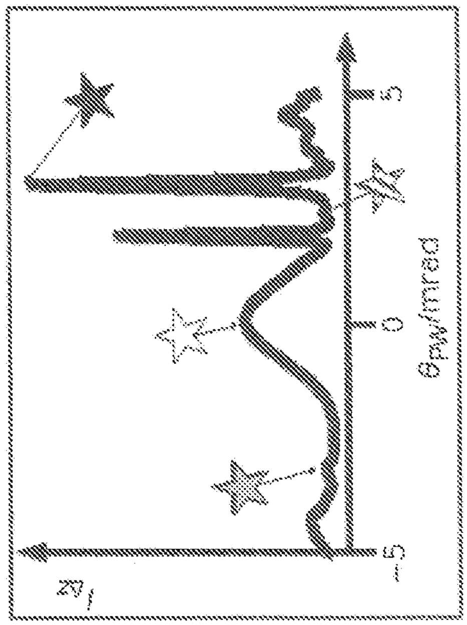
Figure 6A:
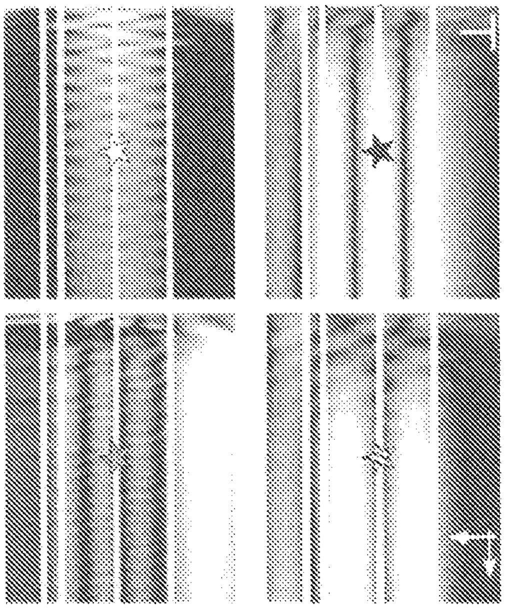
Figure 7B:
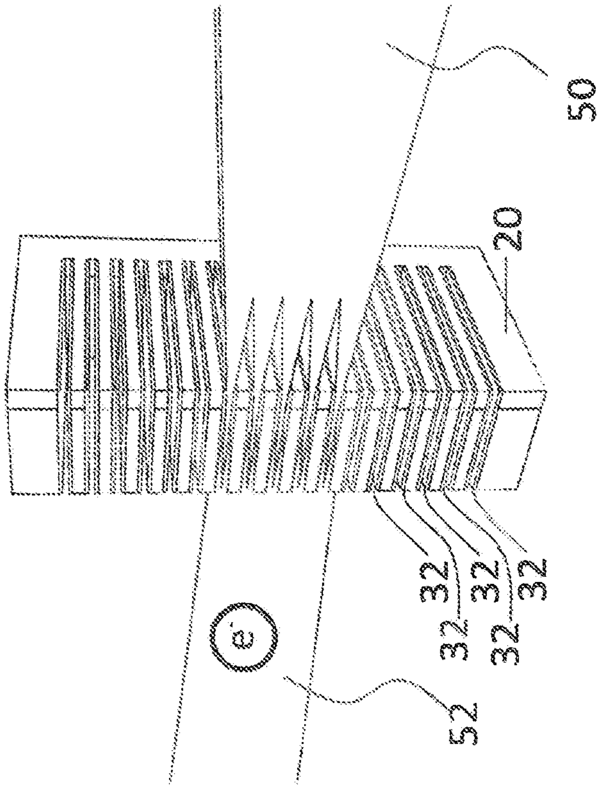
Figure 7A:
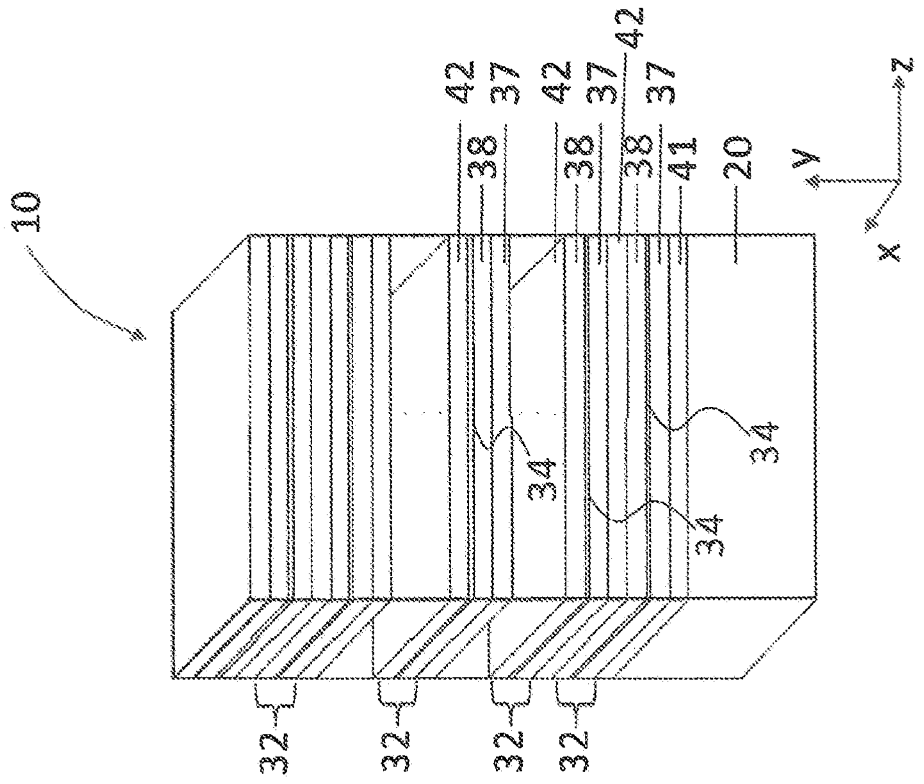
Figure 8:
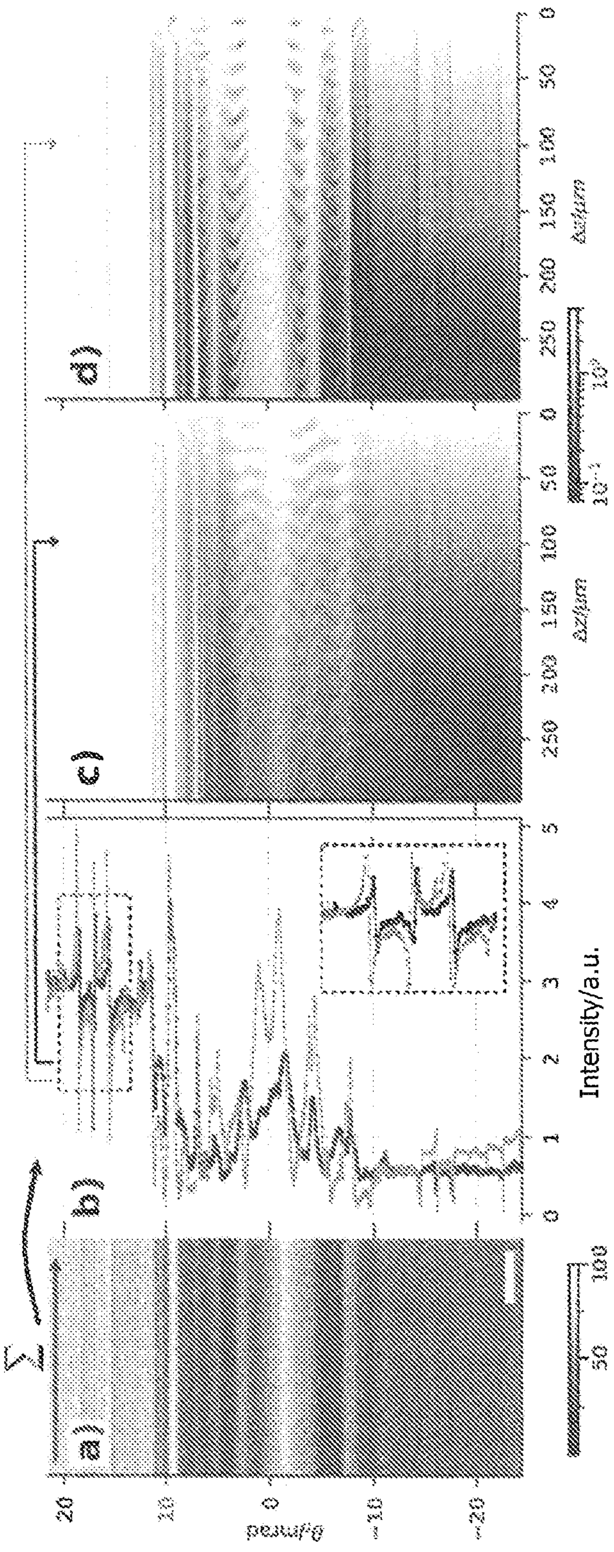
Figure 10:
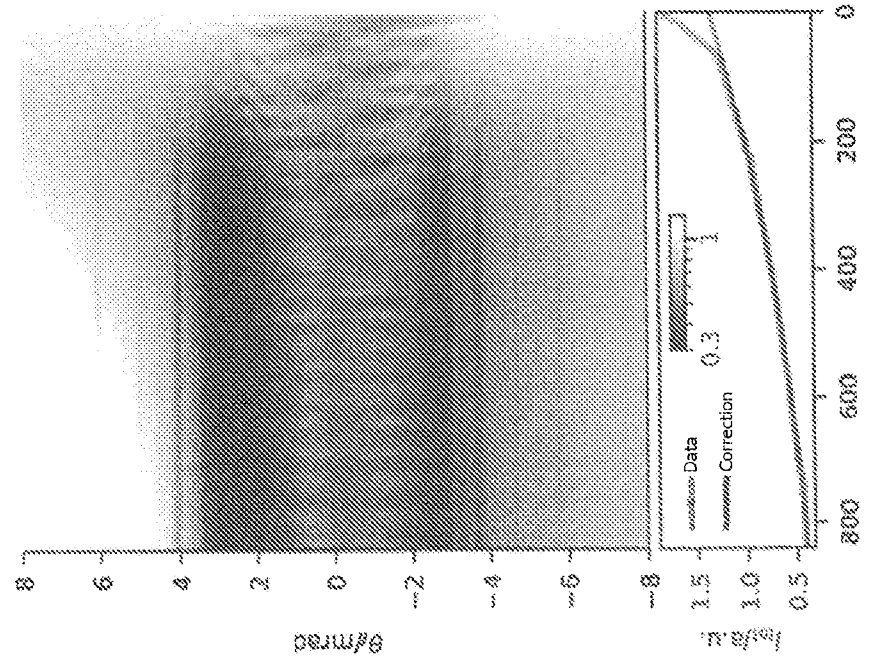
Figure 9:
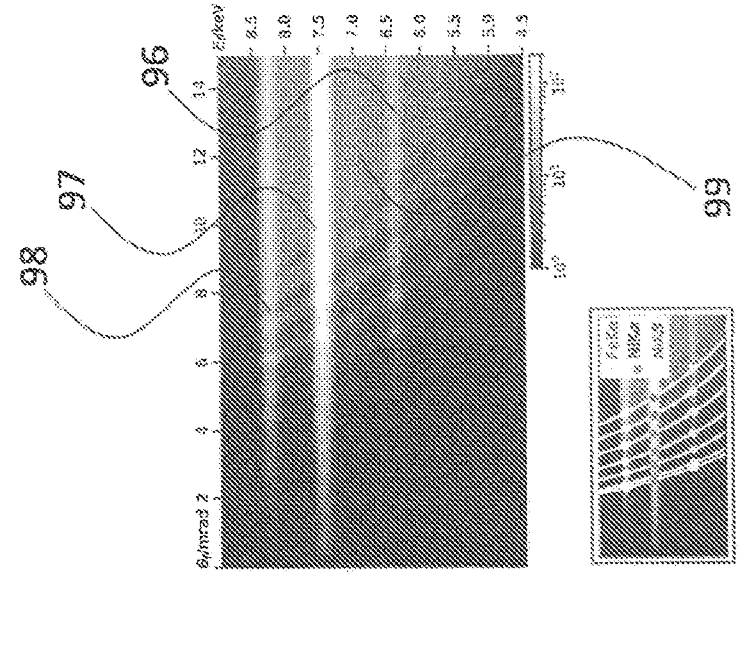
Figure 11B:
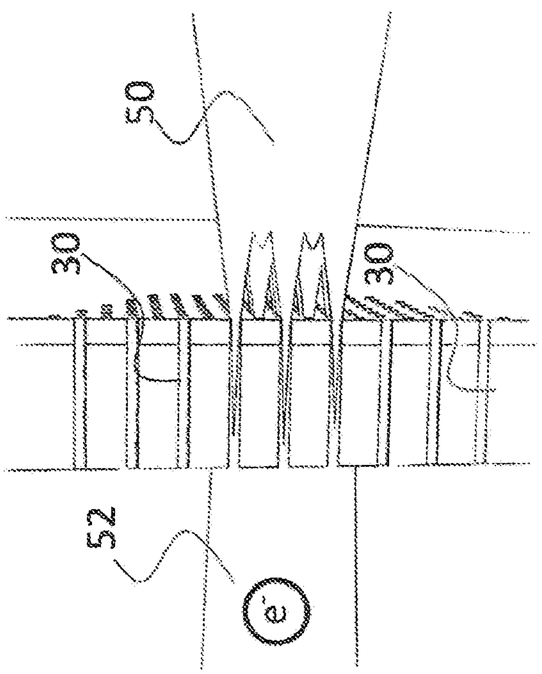
Figure 11A:
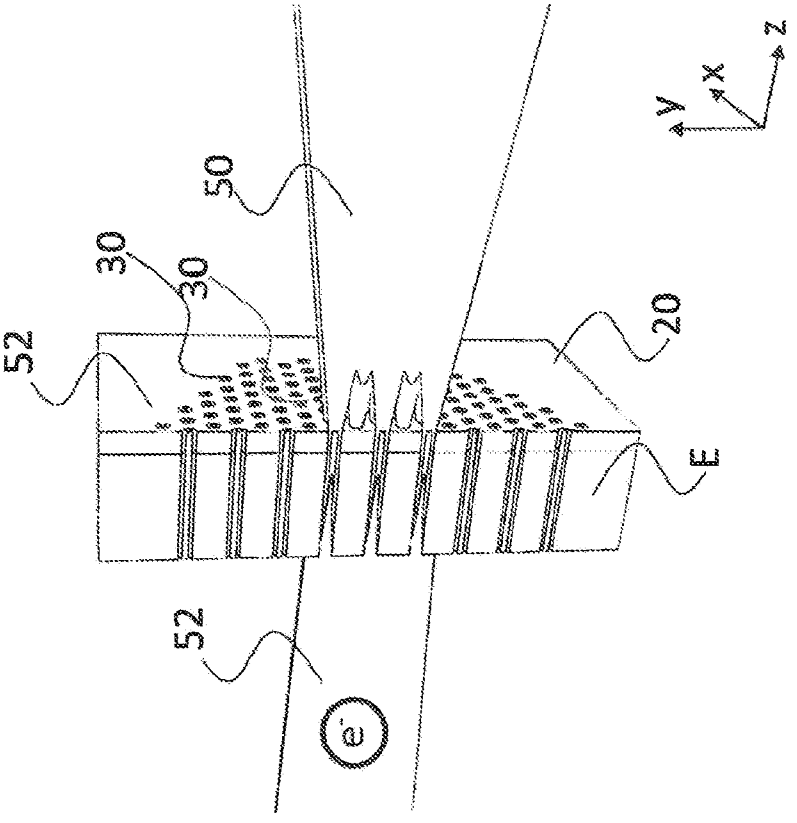
Figure 12:
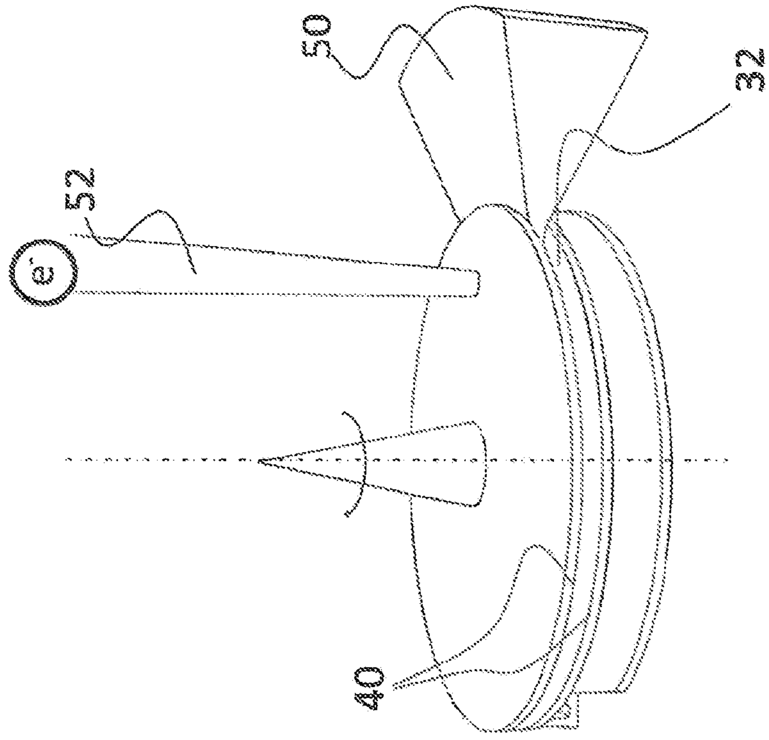

FIGS. 6*a* and 6*b* show simulation results for the X-ray fluorescence intensity distribution in the X-ray source of FIG. 1 on irradiation at different angle of elevations $\theta_{PW}$;

FIGS. 7*a* and 7*b* show a second embodiment of an X-ray source in a perspective detail view and a perspective overall view, wherein this X-ray source has a plurality of one-dimensional waveguides;

FIG. 8 shows measurement and simulation results for the X-ray fluorescence intensity distribution in the X-ray source of FIG. 7*a*/7*b* with a plurality of waveguides on irradiation of focused synchrotron radiation at different angle of elevations $\theta_f$;

FIG. 9 shows a measurement result for the energy distribution of the X-ray radiation of the X-ray source according to FIG. 7*a/b* in dependence on the angle of elevation $\theta_f$ on bombardment of the X-ray source with electrons;

FIG. 10 shows measurement results for the intensity distribution of the X-ray radiation in a third embodiment of an X-ray source on bombardment of the X-ray source with electrons at different distances from the exit of the waveguide;

FIGS. 11*a* and 11*b* show a fourth embodiment of an X-ray source with a plurality of two-dimensional waveguides in perspective partial views; and FIG. 12 shows a fifth embodiment of an X-ray source with a one-dimensional waveguide, wherein the X-ray source is in the form of a rotating anode.

Figure 2:
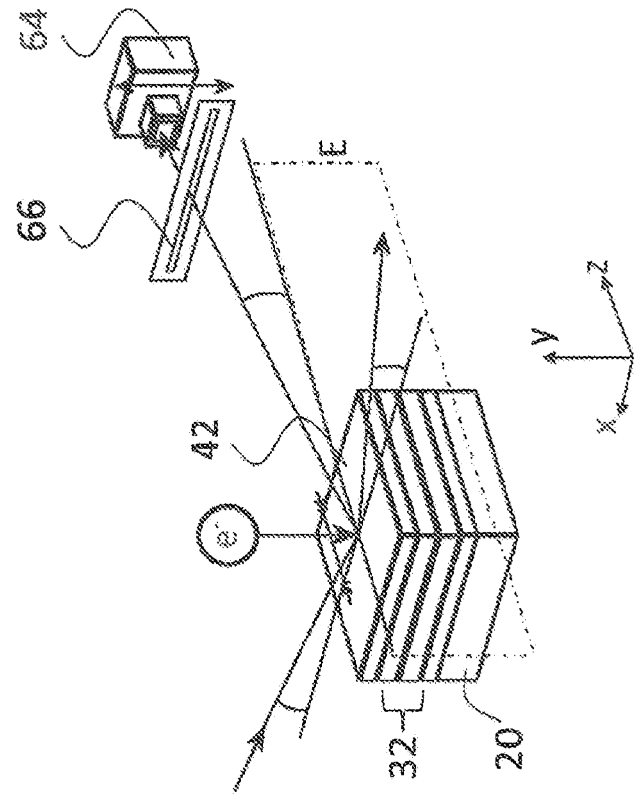

FIGS. 1 and 2 show an X-ray source 10, which in this variant has a substrate 20 and a waveguide 30, carried by the substrate 20, for X-rays. The waveguide 30 comprises a core 32 having a first core portion 34 and a second core portion 36, and a casing 40 which surrounds the core 32 at least in some portions. As is apparent from FIG. 2, the waveguide 30 is a one-dimensional waveguide. Accordingly, the casing 40 is a layer formed directly on the substrate 20. A first portion 41 of the casing 40 is formed as a layer on the substrate 20. On a side of the first portion 41 opposite the substrate 20, a first part 37 of the second core portion 36 is formed, likewise as a layer. The first core portion 34 is formed as a layer on the first part 37 of the second core portion 36. In a transverse direction y perpendicular to the longitudinal axis A, which extends in the longitudinal direction z, of the waveguide 30, a second part 38 of the second core portion 36 covers the first core portion 34, and a second portion 42 of the casing 40 in turn covers the second part 38 of the second core portion 36. The layers are in each case in contact with one another (preferably substantially over the entire surface). FIG. 1 shows the waveguide 30 in a longitudinal section, containing the longitudinal axis A, along the plane E shown in FIG. 2.

The substrate is in the present case a silicon wafer, but it can alternatively be produced from a different material which is suitable for carrying an X-ray waveguide. The first portion 41 of the casing 40 is a copper layer about 40 nm thick, the first part 37 and the second part 38 of the second core portion 36 are each a carbon layer (here for example DLC, diamond-like carbon) about 20 nm thick, the first core portion 34 is a cobalt layer about 2 nm thick, the second portion 42 of the casing is a copper layer about 5 nm thick. However, there are suitable as the material of the first core portion 34 and/or of the casing 40 also other metals, in particular transition metals, or metal alloys comprising the metal in question. Similarly, there are suitable as the material of the second core portion 36 also other non-metals, in particular semiconductors. The first core portion 34 is thus thinner in the transverse direction y than any of the other layers. In particular, the first core portion 34 is thinner than the second core portion 36. The first portion 41 of the casing 40, on the other hand, is thicker than the second portion of the casing 42, in order on the one hand to ensure that the boundary roughness between the first portion 41 of the casing 40 and the first part 37 of the second core portion 36 is low for the purpose of improved total reflection at the casing 40. On the other hand, in this setup electrons 52 are able to pass relatively easily into the core 32 of the waveguide 30 when they are irradiated, as shown in FIG. 1, transversely to the waveguide 30 in the negative y-direction. As a result, a comparatively intensive X-ray emission from the X-ray source 10 is achieved.

Figure 3A:
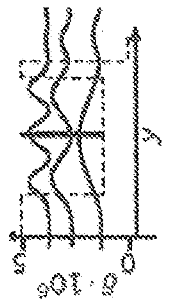

In the case of an X-ray photon energy considered here by way of example of 10 keV, the value of the decrement $\delta$ of the material of the first core portion 34 is between the value of the decrement $\delta$ of the material of the casing 40 (or of at least one of the portions 41 and 42) and the value of the decrement $\delta$ of the material of the second core portion 36 (or of at least one of the parts 37 and 38). It is thereby preferred that the value of the decrement $\delta$ of the material of the casing 40 (or of at least one of the portions 41 and 42) is greater than the value of the decrement $\delta$ of the material of the second core portion 36 (or of at least one of the parts 37 and 38), so that the development of the modes in the waveguide 30 is disrupted as little as possible. For the materials used here for the casing, the first core portion and the second core portion, the following decrement values apply in the case of the above-mentioned X-ray photon energy: copper $1.62\times10^{-5}$; carbon (amorphous) $4.57\times10^{-6}$; cobalt $1.67\times10^{-5}$ (see FIG. 3*a*).

The waveguide 30 of FIGS. 1 and 2 is, as explained above, a one-dimensional waveguide. A modification (not shown in the figures) of this X-ray source 10 of FIG. 1 has a two-dimensional waveguide, the core and casing of which are configured to be substantially (circular-)ring-shaped in cross-section perpendicular to the longitudinal axis A. In the longitudinal section containing the longitudinal axis A, this modified X-ray source has the appearance as shown in FIG. 1. In this respect, the explanation given in relation to the X-ray source 10 with a one-dimensional waveguide 30 here applies analogously to the modified X-ray source with a two-dimensional waveguide.

It is shown schematically in FIG. 1 that the electrons 52 propagate substantially in the negative y-direction before they strike the X-ray source 10. The electron beam is thereby focused on part of the first core portion 34. As shown in FIG. 1, there are thus excited, in addition to the waveguide fundamental mode 60 (m=0), in particular waveguide modes 61, 62 with mode numbers m=1 and m=2, respectively. By measuring the X-ray intensity by means of a semiconductor spectrometer 64 having an entrance slit 66, the angle-of-elevation-, $\theta_f$-, dependent intensity distribution of the X-ray radiation shown in FIG. 3*b* can be determined. Such a measurement can be performed, for example, by focusing electrons with an energy of 35 keV from an electron source for X-ray microtomography (here: an electron source from the X-ray source MetalJet® D2 from Excillum AB, Kista, Sweden) by means of an electron optics (here the electron optics from the same X-ray source MetalJet® D2 from Excillum AB, Kista, Sweden) onto a spot approximately 10 μm in size at a distance Δz of about 1 mm from the exit-side end 54 of the waveguide 30 along the longitudinal axis A onto the grounded X-ray source 10. The X-ray anode of the MetalJet® D2 is thereby de facto replaced by the X-ray source 10.

Figure 3B:
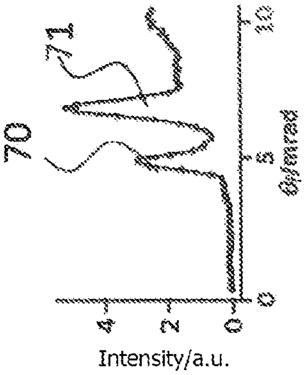

X-ray radiation can thereby be generated in the first core portion 34 of the waveguide 30 and/or in the casing 40, in particular in the second portion 42 of the casing 40, and coupled directly into the core 32 of the waveguide 30. FIG. 3*b* clearly shows that a plurality of waveguide modes are excited. In particular, in the case of the X-ray source 10 of FIG. 1, a fundamental mode (m=0) with an intensity maximum 70 is excited at $\theta_f\approx5$ mrad and the mode m=2 with an intensity maximum 71 is excited at $\theta_f\approx7$ mrad. It is noted that the X-ray radiation not only leaves the waveguide 30 at its end 54 on the exit side in the longitudinal direction z, but also, as indicated in FIG. 1, passes in the form of an evanescent wave (underlying the absorption by the material of the second portion 42 of the casing 40) through the second portion 42 of the casing 40 and exits the waveguide 30 on the side of the second portion 42 of the casing 40 that is opposite the core 32.

Figure 4:
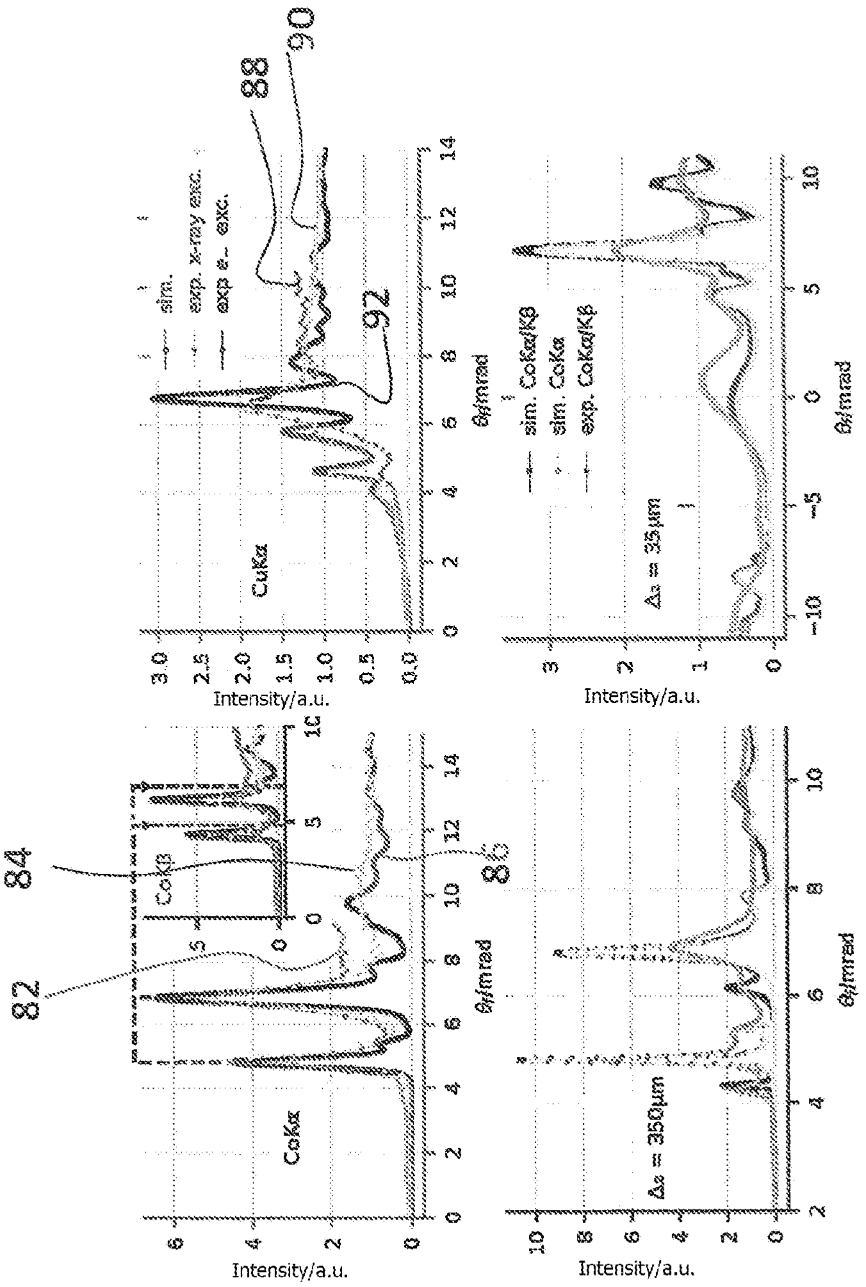
FIG. 4 shows multiple diagrams of the measured and simulated intensity of the X-ray radiation over the angle of elevation $\theta_f$ for the X-ray source of FIG. 1 at different positions of the bombardment with electrons.

FIG. 4 shows four diagrams with measurement and simulation results, from which it is apparent that the dependence of the intensity distribution of the X-ray radiation on the angle of elevation varies with the distance Δz and is additionally dependent on whether the X-ray radiation originates from the casing made of copper or from the first core portion made of cobalt. It is also apparent from the diagrams that simulation results are in agreement with corresponding measurement results. In particular, the top left diagram of FIG. 4 shows the measured emission of the Kα- and Kβ-transitions of the material of the first core portion 34 on electron bombardment (curve 82) and on excitation by means of X-ray or synchrotron radiation (curve 84), together with the corresponding simulation (curve 86). The top right diagram shows the measured emission of the Kα-line of the material of the casing 40 on electron bombardment (curve 88) and on excitation by means of X-ray or synchrotron radiation (curve 90), as well as the corresponding simulation (curve 92). The local intensity maxima correspond to the modes (cobalt: only linear modes (m=0; m=2); copper: linear and non-linear modes). The bottom two diagrams of FIG. 4 show the measured and the calculated intensity distribution of the X-ray emission from the thin cobalt layer (first core portion 34) for a distance Δz of 35 μm and 350 μm. Here too, the measurements confirm the simulation results.

Figure 5:
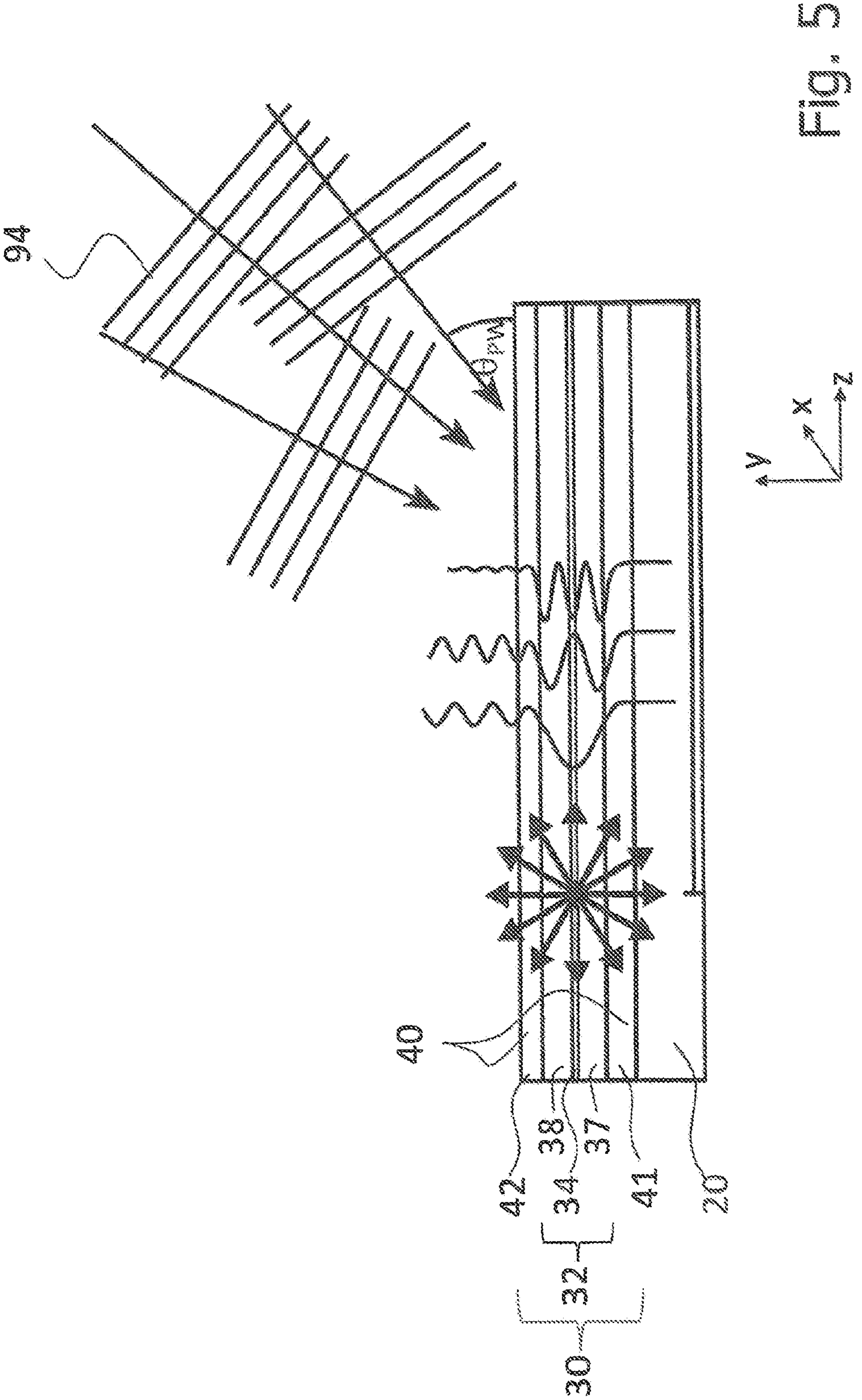
FIG. 5 shows the X-ray source of FIG. 1 on irradiation of X-ray radiation in the form of plane waves for X-ray fluorescence at different angle of elevations $\theta_{PW}$.

The excitation of the modes and the propagation thereof in the X-ray source, in particular in the waveguide, can be calculated by means of finite difference simulation on the basis of the reciprocity theorem. The finite difference simulation can be carried out as described in the scientific publication of L. Melchior and T. Salditt, "Finite difference methods for stationary and time-dependent x-ray propagation", Opt. Express, 25: 32090, 2017, the disclosure of which relating to the finite difference simulation is incorporated herein by reference. As is shown in FIG. 5, this simulation proceeds from a planar wave 94 irradiated at an angle of elevation $\theta_{PW}$. The internal field distribution of the X-ray radiation in the plane E is shown in FIG. 6*a* for irradiation at different angles of elevation $\theta_{PW}$. The probability distribution for the exit of an X-ray photon emitted at a specific point from the X-ray source at a corresponding angle of elevation $\theta_{PW}$ can be seen.

An X-ray source 10 with a plurality of one-dimensional waveguides 30 is shown in FIGS. 7*a* and 7*b*. Each waveguide 30 can have any, in particular all, of the features of the waveguide 30 of the X-ray source 10. The waveguides 30 are positioned in the form of a waveguide stack on the substrate 20. Adjoining waveguides 30 can thereby divide a portion of the casing in the region of the boundary between them. That is to say, a core 32 of a second waveguide 30 can directly adjoin the second portion 42 of the casing 40 of a first waveguide 30 adjacent to the substrate. The materials of the X-ray source 10 of FIG. 7 can be the materials of the X-ray source 10 of FIG. 1. Alternatively, nickel, for example, can be used instead of copper, and iron, for example, can be used instead of cobalt. In this case, the following preferred layer sequence on the silicon substrate is obtained: [Ni (about 10 nm)|C (about 24.5 nm)|Fe (about 1 nm)|C (about 24.5 nm)]$_n$, wherein n is the number of waveguides. The value n can be at least 2. In the case of the X-ray source 10 of FIG. 7, n=50.

For the X-ray source 10 with the preferred layer sequence mentioned above, the X-ray fluorescence intensity distribution on irradiation of focused synchrotron radiation at different angles of elevation Of is shown in FIG. 8. Diagram a) of FIG. 8 shows a distribution of the iron K fluorescence on a MÖNCH3 detector (from Paul Scherrer Institut, Villigen, Switzerland; see M. Ramilli et al., "Measurements with MÖNCH, a 25 μm pixel pitch hybrid pixel detector", J. Instrum., 12: C01071-001071, 2017, the disclosure of which relating to the MÖNCH detector is incorporated herein by reference). There are shown in this distribution intensity in particular peaks and modeling as a function of the exit angle (angle of elevation) Of. Diagram b) shows the correspondingly summed intensity distribution as a function of the exit angle (angle of elevation). The dependence of the intensity distribution over the exit angle on the distance Δz is shown in diagram c). Finally, diagram d) shows a clear agreement of the measurement results with corresponding simulation results based on the reciprocity theorem. As is apparent from FIG. 9, there is emitted by means of the X-ray sources 10 disclosed herein, of which the X-ray source 10 of FIG. 7 with the preferred layer sequence is representative, on bombardment of the X-ray source 10 with electrons, not only characteristic radiation (in FIG. 9: Fe Kα radiation 96, Ni Kα radiation 97, Ni Kβ radiation 98), but also bremsstrahlung radiation 99.

In an X-ray source 10 with a different, likewise preferred layer sequence on the silicon substrate of [Mo (about 25 nm)|C (about 16 nm)|Mo (about 1 nm)|C (about 16 nm)]$_n$, with the above-mentioned values for n (here for example 30), the dependence of the molybdenum fluorescence intensity generated by electron bombardment on the distance Δz between the location of the irradiation and the exit-side end 54 is depicted in FIG. 10. The depicted intensity distribution is corrected in respect of the self-absorption of the emitted fluorescence by the substrate. It is clear that the intensity decreases significantly as the distance Δz increases.

An X-ray source 10 with a plurality of two-dimensional waveguides 30 is shown in FIGS. 11*a* and 11*b*, wherein the first core portion has in each case been omitted for the sake of clarity. Each of the two-dimensional waveguides 30 can here have any, in particular all, of the features of the waveguide 30 from the X-ray source 10. The two-dimensional waveguides 30 can, as is shown in the figures, be formed periodically within a portion having an optionally substantially hexagonal base area in the transverse plane (the x-y plane). The waveguides 30 can be formed substantially cylindrically symmetrically in the substrate 20 and/or can be arranged at substantially equal distances from one another. It is additionally shown in FIGS. 11*a* and 11*b* that the electrons 52 can be irradiated onto the X-ray source 10 in the longitudinal direction (along the axis z). The X-ray radiation 50 leaves the X-ray source on the exit side likewise in the longitudinal direction.

A further variant of an X-ray source 10 with a one-dimensional waveguide 30, here in the form of a rotating anode, is depicted in FIG. 12. The electrons here preferably strike the waveguide parallel to the axis of rotation of the rotating anode. Here too, the first core portion has been omitted for the sake of clarity. The waveguide 30 of the X-ray source of FIG. 12 can have any, in particular all, of the features of the waveguide 30 of the X-ray source 10. As a result of the rotation of the X-ray source 10, the location in the coordinate system of the rotating X-ray source 10 at which the electrons 52 bombard the first core portion 34 migrates along a circular path, so that larger electron streams can advantageously be used and correspondingly higher X-ray intensities can be achieved.

The X-ray sources described herein are adapted to emit radiation in one or more angle ranges with dimensions below about 10 mrad. The efficiency of the generation of the X-ray radiation is substantially higher in the case of X-ray sources according to the invention than in the case of conventional systems for generating X-ray radiation, in which the X-ray radiation is generated outside the waveguide and then coupled into a waveguide. The X-ray sources according to the present invention are therefore distinguished not only by a small and compact construction but also by high brilliance. With the X-ray sources proposed herein, the photon yield in a phase space volume which is defined by the exit surface (source surface) and the solid angle of the radiation of the waveguide modes can be increased by a factor of from 10 to 100 for one-dimensional waveguides and from 100 to 10,000 for two-dimensional waveguides. The X-ray source according to the invention accordingly has a comparatively high phase space density and coherence. Therefore, the present invention makes it possible to perform in the laboratory many different X-ray analyses (for example by means of X-ray microtomography) for which synchrotron sources were hitherto required.

The invention claimed is:

1. An X-ray source comprising
at least one waveguide for X-rays, wherein the waveguide has a main direction of extent along which the X-rays propagate within the waveguide,
wherein the at least one waveguide has a core and a casing surrounding the core,
wherein the core has a first core portion and a second core portion, wherein the second core portion is arranged displaced with respect to the first core portion in a direction transverse to the main direction of extent,
wherein at least the first core portion is adapted to emit X-ray radiation if it is bombarded with electrons,
wherein the material of the first core portion is a first metal, preferably a transition metal, or a metal alloy comprising the first metal,
wherein the material of the second core portion is a non-metal, and
wherein the material of the first core portion, the material of the second core portion and the material of the casing are configured such that at least part of the emitted X-ray radiation propagates within the core under total reflection at the casing.

2. The X-ray source as claimed in claim 1,
wherein the first core portion is thinner than the second core portion,
and/or wherein the first core portion has a smaller volume than the second core portion.

3. The X-ray source as claimed in claim 1,
wherein the material of the first core portion has elements with a first atomic number and the material of the second core portion has elements with a second atomic number, wherein the first atomic number is different from the second atomic number, wherein the first atomic number is in particular greater than the second atomic number,
wherein the first atomic number is at least 16,
and/or wherein the second atomic number is not more than 15.

4. The X-ray source as claimed in claim 3, wherein the first atomic number is at least 22.

5. The X-ray source as claimed in claim 3, wherein the second atomic number is not more than 6.

6. The X-ray source as claimed in claim 1,
wherein the material of the first core portion comprises one or more elements from the following group: cobalt, copper, molybdenum, nickel, chromium, iron, silver, tantalum, platinum, gold, tungsten,
and/or wherein the material of the casing comprises one or more elements from the following group: cobalt, copper, molybdenum, nickel, chromium, iron, silver, tantalum, platinum, gold, tungsten,
and/or wherein the material of the second core portion comprises one or more elements from the following group: carbon, boron, silicon.

7. The X-ray source as claimed in claim 1,
wherein the material of the first core portion, the material of the second core portion and/or the material of the casing each has a refractive index for X-ray radiation for the real part of which the following formula applies: $n=1-\delta$, wherein $\delta$ is the decrement for the first or second core portion, by which the real part of the respective refractive index for X-ray radiation with a photon energy of 10 keV differs from 1.

8. The X-ray source as claimed in claim 7,
wherein the value of the decrement $\delta$ of the material of the first core portion is greater than the decrement $\delta$ of the material of the second core portion by at least 20%, at least 50% or at least 100% of the value of the decrement of the material of the second core portion,
and/or wherein the decrement $\delta$ of the material of the first core portion and/or of the material of the casing is at least $1\times10^{-7}$, at least $5\times10^{-7}$, at least $1\times10^{-6}$ or at least $5\times10^{-6}$,
and/or wherein the decrement $\delta$ of the material of the second core portion is not more than $5\times10^{-5}$, not more than $3\times10^{-5}$, not more than $1\times10^{-5}$ or not more than $5\times10^{-6}$.

9. The X-ray source as claimed in claim 1,
wherein the thickness of the first core portion is not more than 50%, not more than 30%, preferably not more than 15%, of the thickness of the second core portion,
wherein the first core portion is preferably not more than 15 nm or not more than 10 nm thick, and/or wherein the thickness of the second core portion is preferably from 10 nm to 400 nm, most preferably from 20 nm to 200 nm.

10. The X-ray source as claimed in claim 1,
wherein the first core portion is arranged spaced apart relative to the casing,
and/or wherein the first core portion, when viewed in a cross-sectional plane of the waveguide, is arranged in the middle of the second core portion,
and/or wherein the casing is thicker on one side of the core than on the other side of the core.

11. The X-ray source as claimed in claim 1,
wherein the at least one waveguide is a two-dimensional waveguide with a substantially circular, oval, polygonal, in particular rectangular or square, cross-section, or
wherein the at least one waveguide is a one-dimensional waveguide, the core and casing of which are in the form of layers.

12. The X-ray source as claimed in claim 1,
wherein the number of waveguides is at least two, wherein the waveguides are preferably arranged parallel to one another.

13. The X-ray source as claimed in claim 1,
wherein at least one part of the casing, in particular the entire casing, is adapted to emit X-ray radiation if it is bombarded with electrons.

14. A system for generating X-ray radiation, comprising
a vacuum chamber,
an X-ray source as claimed in claim 1 arranged in the vacuum chamber, and
an electron source arranged in the vacuum chamber, which electron source is adapted to emit electrons into the vacuum and radiate them onto the X-ray source.

15. A method for generating X-ray radiation, comprising the following steps:
providing an X-ray source as claimed in claim 1, and
irradiating at least the first core portion of the waveguide of the X-ray source with synchrotron radiation, with ions, in particular with high-energy ions, with laser pulses, in particular with ultra-short and/or focused laser pulses, in order to generate the X-ray radiation, and/or bombarding at least the first core portion of the waveguide of the X-ray source with electrons in order to generate the X-ray radiation.

* * * * *